W. MULLINS.
Lantern.
No. 40,057. Patented Sept. 22, 1863.
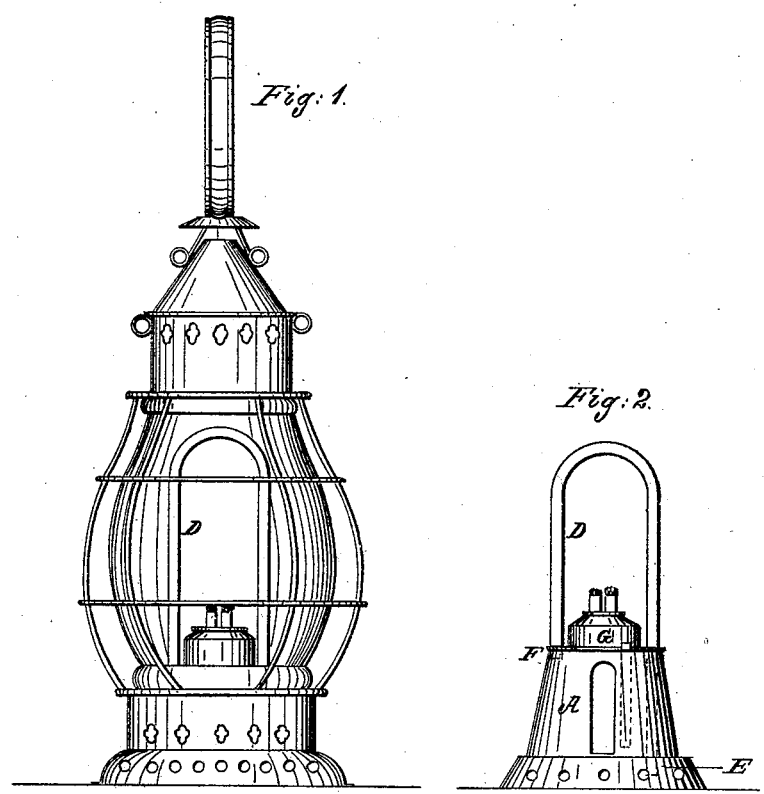
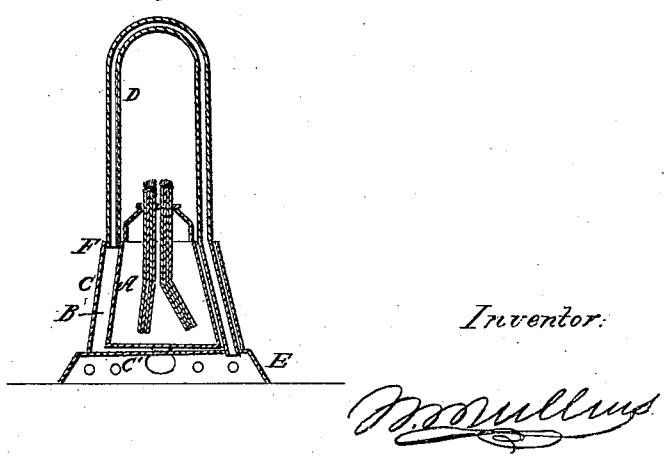

UNITED STATES PATENT OFFICE.

WILLIAM MULLINS, OF STEUBENVILLE, OHIO.

IMPROVEMENT IN LANTERNS.

Specification forming part of Letters Patent No. 40,057, dated September 22, 1863.

*To all whom it may concern:*

Be it known that I, WILLIAM MULLINS, of Steubenville, in the county of Jefferson and State of Ohio, have invented new and useful Improvements in Lamps for Railroad-Lanterns for Burning Animals Fats and Oils; and I do hereby declare that the following is a full and complete description of the construction and operation of the same, reference being had to the accompanying drawings, making part of this specification, in which—

Figure 1 is a view of the lantern and lamp. Fig. 2 is a view of the lamp detached from the lantern, and Fig. 3 is a vertical section of the lamp.

The nature of my invention relates to such a construction of the lamp that fats and oils that are usually solid in cold weather can be burned as readily as the best winter strained oil. In order to accomplish this, it is necessary to keep the oil or fat in a fluid state.

For this purpose I construct the body of the lamp double, as seen in Fig. 3—that is, the oil-cup A is surrounded by an air-chamber, B. The walls of this chamber are shown at C C'. The oil or fat in the oil-cup A is kept in a fluid condition by supplying the air-chamber B with heated air. This is done by means of a bent tube, D, which is inserted through the bottom plate, C', of the air-chamber, as shown at E, thence rising between the wall C and cup A, and curving over the lamp flame some four or five inches above it, thence descending and entering the air-chamber at F. At G is shown a small vent-tube, which passes through the upper wall of the air-chamber, and reaches nearly to the bottom, by means of which a circulation is kept up in the chamber, the cooler air being forced out through the vent-tube, giving place for the heated air as it enters through the vent-tube D.

Now, suppose the cup A to be filled with oil that becomes solid or congeals in cool weather, under ordinary circumstances, even in summer nights, it will not remain fluid in a common lamp, and in winter, especially, it very soon congeals and ceases to burn after being poured into the bowl of the lamp in a melted state; but with my improvement, as soon as the lamp is lighted, the air in the tube D become heated, causing an ascending current in the long leg D', the heated air being discharged into the chamber B, which surrounds the oil-cup A, thus keeping the oil or fat in a fluid condition, even in the coldest winter weather, by the elevated temperature of the air chamber B.

What I claim as my improvement, and desire to secure by Letters Patent, is—

Surrounding the oil-cup with a hot-air chamber and supplying heat thereto by means of the bent tube D, passing over the flame of the lamp from a point below the bottom of the oil-cup, and discharging into the air-chamber, in the manner and for the purpose specified.

W. MULLINS.

Witnesses:
G. H. BENHAM,
J. BRAINERD.